Feb. 21, 1967  E. R. PHILLIPS ET AL  3,305,171
VISUAL FLUID READ-OUT DEVICE
Filed July 26, 1965  2 Sheets-Sheet 1

INVENTORS
EDWIN R. PHILLIPS
MARVIN JACOBY

BY *H. Walter Elmer*

AGENT

United States Patent Office

3,305,171
Patented Feb. 21, 1967

3,305,171
VISUAL FLUID READ-OUT DEVICE
Edwin R. Phillips, Rosemont, and Marvin Jacoby, Fort Washington, Pa., assignors to Sperry Rand Corporation, New York, N.Y., a corporation of Delaware
Filed July 26, 1965, Ser. No. 474,562
9 Claims. (Cl. 235—201)

This invention has to do with visual read-out devices, but more particularly to fluid actuated read-out devices for fluid operated computers, or the like.

The contemplated wide use of fluid circuits in computers or calculators, and the like, will require fluid operated visual read-out means so that the results of computer functions may be registered and easily observed.

It is the primary object of the invention, therefore, to provide a visual read-out device for fluid operated computers, and the like.

Another object is to provide a fluid read-out device which is characterized by its simplicity and low cost.

More specifically, it has as an object to provide a fluid actuated visual read-out device which eliminates the need for expensive and complex transducers.

Briefly described, the invention comprises a housing having an elongated tubular passageway in which is received a fluid responsive member, such as a ball, of slightly less diameter than the passageway. A number of radial cross-bores extend through the housing wall to intersect the passageway and provide means for connecting the passageway to the fluid circuit of the computer whereby the passageway may be subjected to pressures of relative values along its length to cause the ball to move through the passageway to a selected cross-bore. The ball's positions at the cross-bores are visible through transparent portions of the housing and the positions are sequentially numbered on the housing thus visually indicating the result of a computer operation. A plurality of the devices may be provided so that multiunit numbers or messages may be registered.

Figure 1:
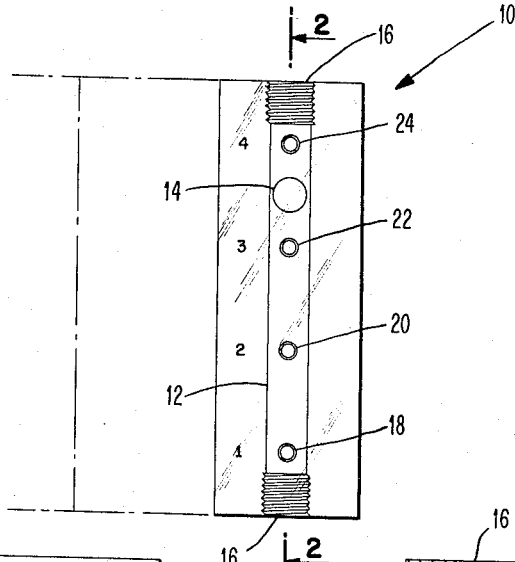
FIGURE 1 is a front elevational view of a read-out device in accordance with the invention.

In FIGURE 1, it is seen that the preferred form of the invention comprises a transparent housing member 10 having a smooth elongated passageway or bore 12 formed therein. A fluid responsive member, such as ball 14, of slightly less diameter than bore 12 is housed within the bore with sufficient freedom to travel its full length established by the stop members 16 screwed into and sealing its opposite ends.

A predetermined number of aligned radial cross-bores 18, 20, 22 and 24 have been formed through the wall of the housing 10 to the main bore 12 and provide the means for interconnecting the main bore at spaced intervals along its length with the fluid computer 26, by way of conduits diagrammatically indicated at 28, 30, 32 and 34.

Attached to, or formed on the housing in line with cross bores 18–24 are sequentially arranged numbers, 1–4. Other designations, such as letters, may also be used. The proximity of the ball to a number constitutes the read-out function of the device. In other words, its proximity to the number 4, as illustrated in FIGURE 1, indicates that the fluid logic circuit output is at that value. More or less numbered cross-bores may be provided, as desired or necessary.

While a fully transparent housing is contemplated in this form of the invention, an opaque housing with transparent windows at the various numbered ball positions would serve equally as well.

While other computers or calculators can be used with the invention, a suitable one is disclosed in Patent 3,190,554 which issued June 22, 1965 to the assignee of the present invention. As a result of the computer operation fluid under a predetermined pressure, which may be above atmospheric, can be introduced into bore 12 through the conduits 28–34, and any of the conduits can be connected to a lower pressure, such as atmospheric. Other similarly relative pressures may, of course, be used.

Figure 2:
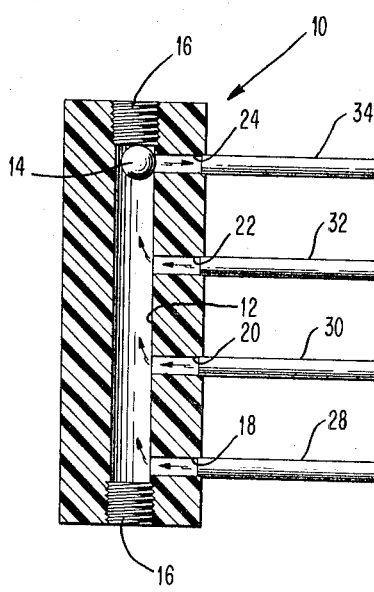
FIGURE 2 is a sectional view taken along line 2—2 of FIGURE 1, and futher showing its connections to a computer.

FIGURE 2 will now be used to explain how this pressure difference is used to position the ball 14 at any one of the four positions 1–4.

Let it be assumed that the computer computation calls for a read-out of 3. Fluid from the computer at a predetermined above atmospheric pressure is introduced into the bore 12 through conduits 28, 30 and 34 and interconnecting cross-bores 18, 20 and 24, while bore 22 is subjected to a lower pressure, such as atmospheric, through conduit 32. Since the fluid flow is "in" at the bores having values of 1, 2 and 4 and "out" at 3, the ball, because of the pressure difference across it, will be driven to bore 22 at value 3. In other words, fluid entering through bore 24 builds up pressure behind the ball and pushes it to the point of lowest pressure where the fluid is leaving through bore 22. At this position the pressure across the ball is equalized and the ball position stabilized. The ball may similarly be moved to any of the other read-out values called for by the computer.

Preferably the ball is manufactured of light weight material, to allow rapid motion to its various positions. It may also be of a bright color in contrast with the housing.

Figure 3:
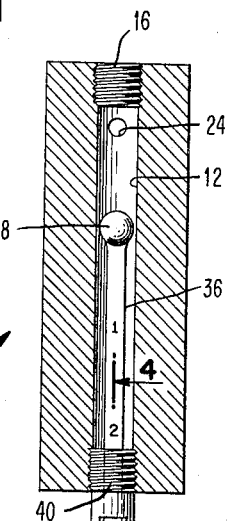
FIGURE 3 is an elevational view of a modified form of the invention.
Figure 4:
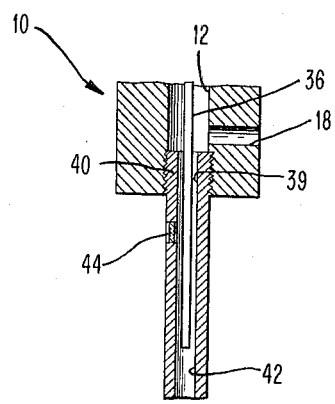
FIGURE 4 is a sectional view taken along line 4—4 of FIGURE 3.

To avoid vertical travel of the eye when reading the position of the ball, the device may be modified as shown in FIGURES 3 and 4. In this form, a light weight strip 36 of plastic or other suitable material, is attached to the bottom of the ball 38 and extends through a slot 39 in the lower ball stop 40 into a flattened chamber 42 preferably hanging from the stop member. The strip 36 is provided with numerals 1–4 corresponding to the four ball positions. The chamber 42 is formed of, or coated with, an opaque material except for a small transparent window 44 through which a single numeral on the strip, corresponding to the ball position, is visible. The ball housing may be completely opaque.

As indicated by the broken lines 46 in FIGURE 1, a plurality of these devices may be assembled or formed together as a unit to provide a multidigit or unit read-out.

Figure 5:
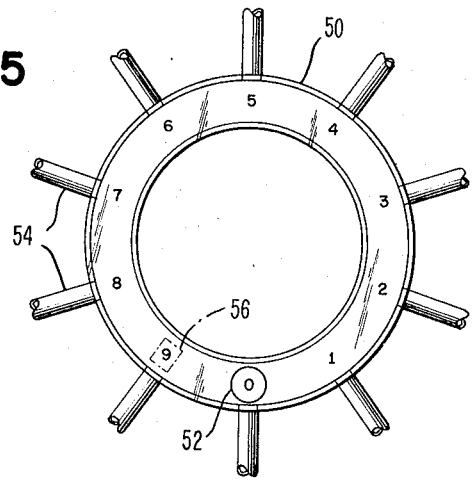
FIGURE 5 is an elevational view of a modified form of the invention.

As seen in FIGURE 5, the housing 50 is shown as a closed loop or circle in which the ball 52 is freely movable in either a clockwise or a counterclockwise direction in response to differential pressures, as described above. Inputs 54, preferably are equally spaced around the housing which may be transparent, or if desired, opaque with transparent windows 56 at each digit indicating position.

Figure 6:
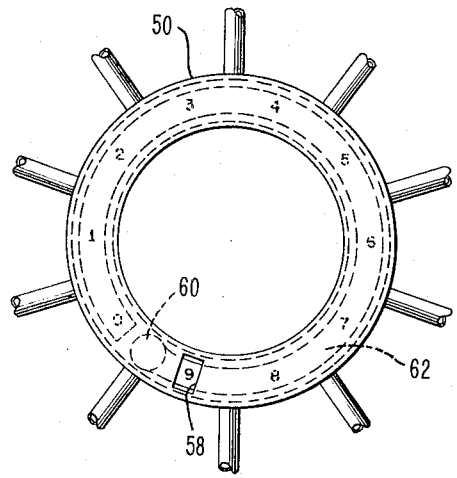
FIGURE 6 is an elevational view of still another modified form of the invention.

Alternatively, as seen in FIGURE 6, only one window 58 may be provided. In this case, the ball 60 moves an indicia strip 62 so that the proper value is visible through the window.

The embodiments of the invention in which an exclusive property or privilege is claimed are defined as follows:

1. A visual read-out device for fluid operated apparatus, such as computers and the like, comprising:

(A) a housing member having an elongated tubular passageway formed therein;

(B) a fluid responsive member forming a fluid tight fit within said passageway and having a transverse dimension slightly less than that of the passageway with freedom to move from one end thereof to the other end; and (C) at least three cross-bores formed through the wall of said housing and intersecting said passageway at spaced points along its length, means applying a relatively low fluid pressure to a selected one of said cross-bores and simultaneously a relatively high fluid pressure to the remainder of said cross-bores whereby said fluid responsive member may be moved by pressure differences across it to said selected one of said cross-bores thereby to provide a visual read-out by the position of said fluid responsive member in said passageway.

2. A construction according to claim 1 wherein said fluid responsive member (B) is a ball whose diameter is slightly less than the transverse diameter of said tubular passageway to permit freedom of movement of said ball within said passageway while forming a fluid tight fit within said passage.

3. A construction according to claim 1 wherein said housing (A) is transparent at least in the area of said cross-bores (C) whereby the positions of said member (B) may be visually observed.

4. A fluid read-out device according to claim 1 and further including:
(A) an indicia strip attached to said member and extending out of said housing (A) to indicate the position of said member in said housing.

5. A construction according to claim 4 and further including:
(A) indicia on said strip corresponding to the positions of said member;

(B) an opaque housing enclosing said strip and having a transparent window through which the indicia corresponding to the member position in said passageway may be observed.

6. A visual read-out device according to claim 5 wherein:
(A) said passageway is a straight bore; and
(B) said fluid responsive member is a ball.

7. A fluid read-out device according to claim 1 wherein:
(A) said housing passageway is curved.

8. A fluid read-out device according to claim 1 wherein:
(A) said housing passageway is a full circle.

9. A fluid read-out device according to claim 8 and further including:
(A) an indicia strip attached to said member and extending around said passageway; and
(B) a transparent window in said housing through which indicia on said strip corresponding to the position of said member in said passageway may be observed.

References Cited by the Examiner

UNITED STATES PATENTS

| | | | |
|---|---|---|---|
| 1,621,354 | 3/1927 | Dawley | 73—208 |
| 1,807,752 | 6/1931 | Poster | 73—419 |
| 1,894,372 | 1/1933 | Fleck et al. | 73—419 |
| 1,894,648 | 1/1933 | Wahl | 73—419 |
| 2,003,474 | 6/1935 | Schweitzer | 73—208 |
| 2,620,661 | 12/1952 | Roux | 73—419 |
| 3,126,739 | 3/1964 | Whitehall | 116—117 |
| 3,151,623 | 10/1964 | Riordan | 137—112 |
| 3,183,713 | 5/1965 | Gilmont | 73—209 |

FOREIGN PATENTS 1,329,720  5/1963  France.

RICHARD B. WILKINSON, *Primary Examiner.*

W. F. BAUER, L. R. FRANKLIN, *Assistant Examiners.*